Oct. 8, 1940.　　　　E. M. MORLEY　　　2,217,288
TIRE INFLATION
Filed April 30, 1928　　2 Sheets-Sheet 1
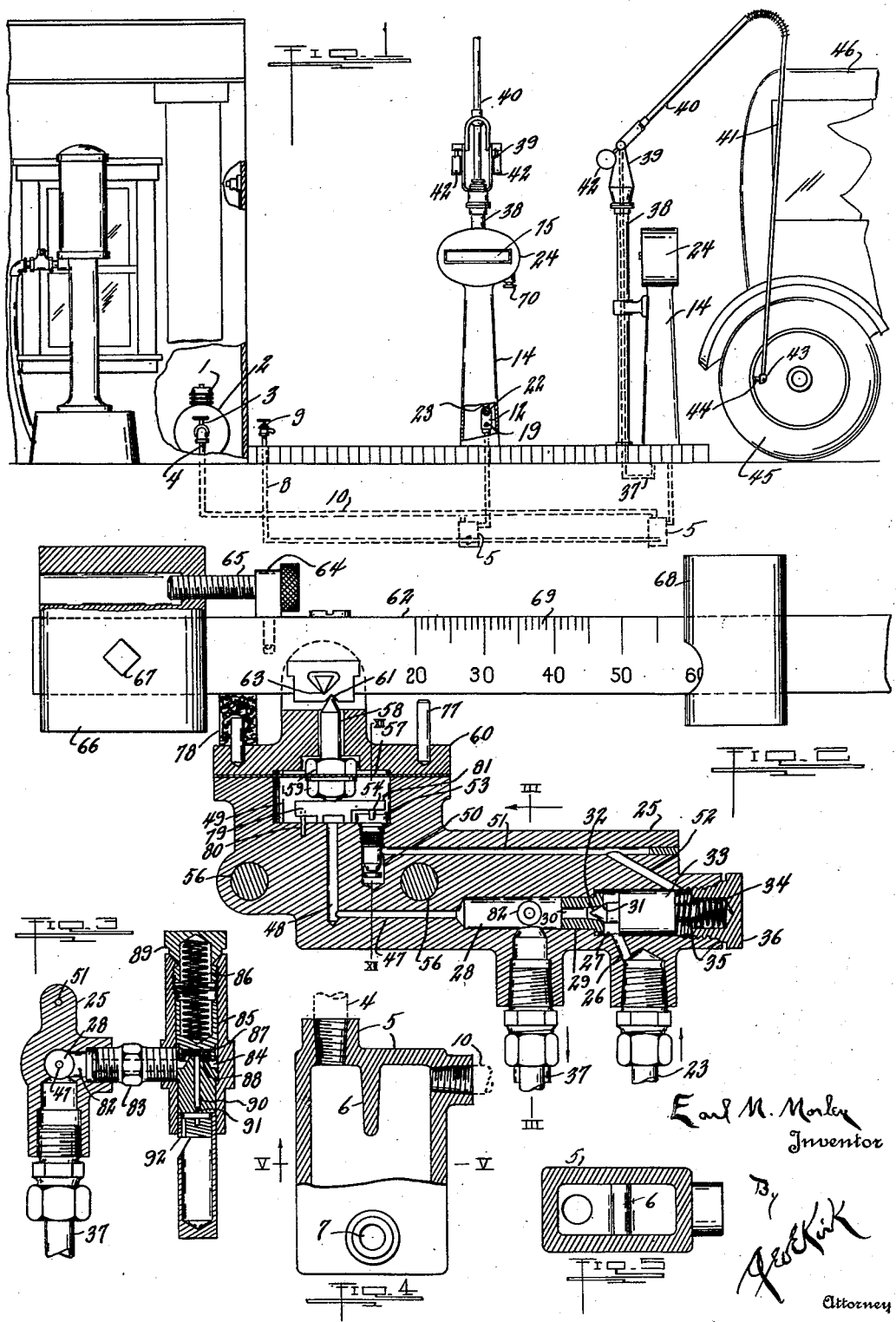
Earl M. Morley
Inventor
By
Attorney Oct. 8, 1940.   E. M. MORLEY   2,217,288
TIRE INFLATION
Filed April 30, 1928   2 Sheets-Sheet 2
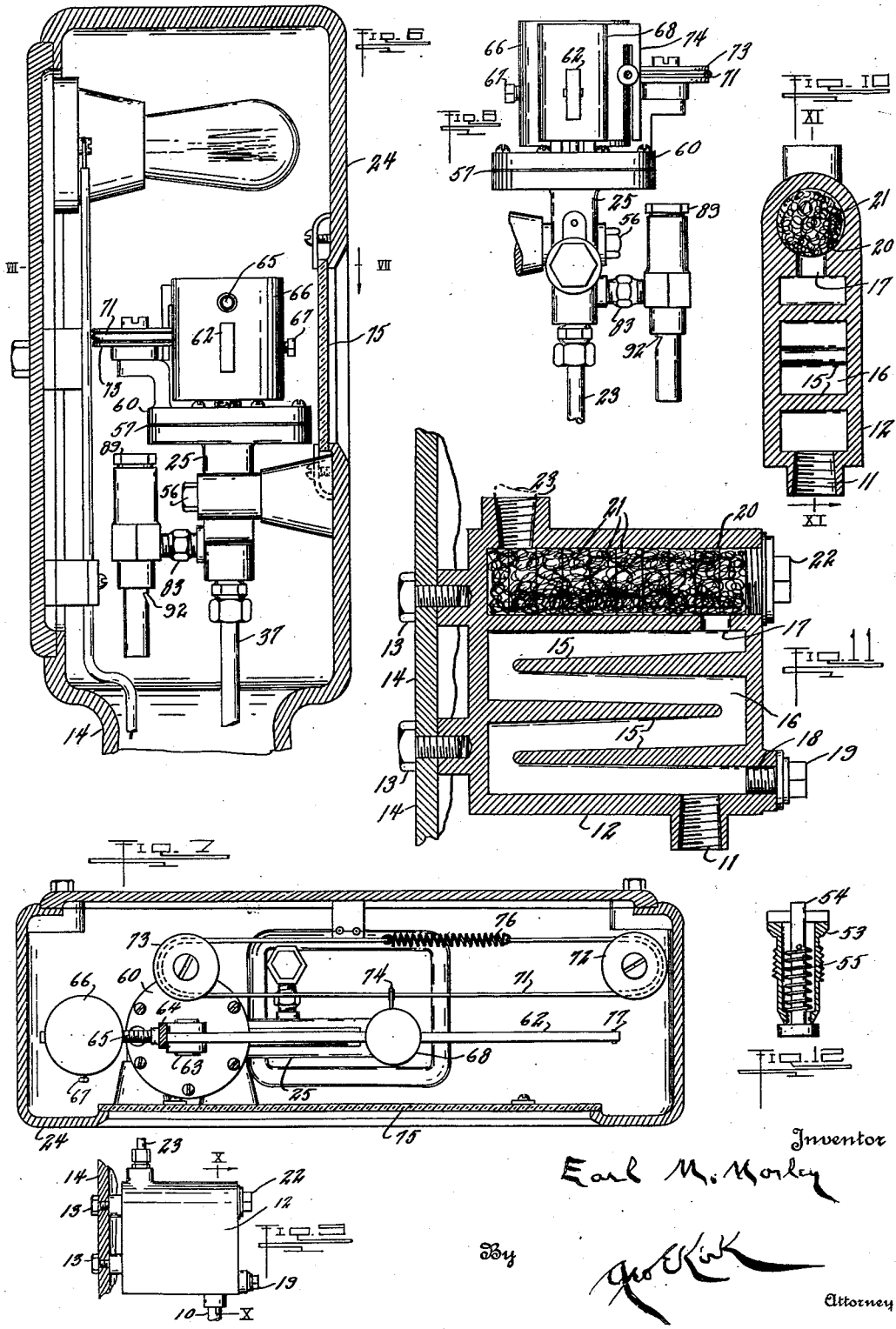
Inventor
Earl M. Morley
By
Geo E Kirk
Attorney Patented Oct. 8, 1940

2,217,288

UNITED STATES PATENT OFFICE 2,217,288

TIRE INFLATION

Earl M. Morley, Delta, Ohio, assignor, by mesne assignments, to himself and W. Stanley Carroll Application April 30, 1928, Serial No. 274,107

7 Claims. (Cl. 50—11)

This invention relates to fluid delivery apparatus.

This invention has utility when incorporated in tire inflation equipment, more particularly as adjustable for predetermined back pressure automatic cut off.

Referring to the drawings:

Fig. 1 is an embodiment, with parts broken away, of an installation for tire inflation;

Fig. 2 is a detail view on an enlarged scale in vertical section of the valve and by-pass between the supply and delivery ducts as the control herein;

Fig. 3 is a section on the line III—III, Fig. 2;

Fig. 4 is a detail view, partially in section, of the water trap chamber from the supply duct;

Fig. 5 is a section on the line V—V, Fig. 4, looking in the direction of the arrow;

Fig. 6 is an end elevation of the device of Fig. 2, with the housing shown in section;

Fig. 7 is a section on the line VII—VII, Fig. 6, looking in the direction of the arrow;

Fig. 8 is an elevation of the apparatus from the right of Fig. 2;

Fig. 9 is a detail view, in side elevation, of the secondary chamber in the supply line, herein shown as a filter chamber;

Fig. 10 is a section on the line X—X, Fig. 9, on an enlarged scale;

Fig. 11 is a section on the line XI—XI, Fig. 10; and

Fig. 12 is a partial section on an enlarged scale on the line XII—XII, Fig. 2.

Motor compressor 1 is shown as connected for placing air under pressure in reservoir 2. Valve 3 at this reservoir 2 permits flow of pressure air by line 4 into chamber 5. This chamber 5 is shown as provided with baffle 6. From its lower portion there is port 7 to which is connected pipe 8 having valve 9 which may be opened as a blow off of condensation, whether oil or water, as accumulating in this expansion chamber 5.

From this chamber 5 extends duct 10 as a continuation of the supply duct 4. This duct 10 extends to port 11 in the lower portion of expansion chamber 12, herein shown as mounted by bolts 13 in standard 14 as a tower. This housing 12 is shown as provided with a plurality of horizontally extending baffles 15 providing a tortuous way 16 from which there is upper outlet port 17 and lower port 18 normally closed by plug 19. This expansion chamber 12 from the duct 10 may be a secondary accumulation receiver for precipitated or condensation material, although such as liquid in the layout should work back to the chamber 5. However, the removal of plug 19 occasionally may permit checking up as to the condition of this chamber 12. The port 17 is in communication with way 20 in which are assembled a plurality of fibrous disks 21 jambed into more or less compacted relation by closure plug 22. There is thus provided an effective filter against entrained particles passing from the housing 12, so that duct 23 therefrom may be a continuation of the supply duct 4, 10.

This supply duct 23 rising in the tower 14 extends up into casing 24 mounted on this tower 14 and there enters housing 25. From this supply duct 23 there is port 26 into valve chamber 27 in the housing 25. Between this chamber 27 and chamber 28 is plug 29 providing port 30 having seat 31 toward the chamber 27 as the supply duct side of this valve device. Needle valve 32 carried by closure plug 33 is urged into seating relation with this seat 31 of the port 30 by helical compression spring 34 about stud 35 on the closure plug 33. The spring 34 hereunder is a force tending normally to thrust the plug 33 to have the needle valve 32 seat at the port 31. The supply duct pressure into chamber 27 acts on the shoulder of the plug 33 to unseat this valve 32 when the spring 34 is not supplemented by sufficient pressure. Accordingly on delivery pressure drop the supply duct pressure unseats the plunger 33 for pressure replenishment in the pulsation operation hereunder. Adjustable nut 36 may be operated to determine the compression of the spring 34 and thus vary the seating action of the plug 33. However, the principal purpose of this nut 36 is that it is removable so that access may be had to the valve for not only removing the plug 33 but to check up as to the conditions of the seat 31 and needle 32, and permit replacement as such may be desired. This plug 33 acts as a piston to the chamber 27.

With the valve open as brought about by pressure through the port 30 from the chamber 28 acting to unseat the closure 33, supply pressure air from the duct 23 may pass through the chamber 28 for flow into delivery duct 37 herein shown as extending downward through the tower 14 thence upward in tower 38 to head 39 carrying rocking lever 40 as a continuation of the duct 37 with flexible line 41 therefrom retrieved by counter-weights 42 on the lever 40. This flexible duct 41 terminates in valve 43 normally closed except as unseated by being applied to tire valve 44 for inflating pneumatic tire 45 on motor vehicle 46.

With this pressure air supplied from the duct 23 into the chamber 28, such herein has communication to the chamber 27 on the side of the piston 33 in the region of the spring 34, such communication being by a controller or by-pass herein, in addition to the slow leakage past the piston 33 from the high pressure supply duct 23. The unseating action of this piston is effected by pressure from the duct 26 against this piston 33 at the region of the seat 31. This by-pass communication from the chamber 28 to the chamber 27 is by ways 47, 48, to chamber 49 in the housing 25. From this chamber 49 there is minor chamber 50 with ways 51, 52, therefrom to the chamber 27 on the side of the piston 33 remote from the port 30. This by-pass has in the chamber 50, plug 53 having therein plunger 54 normally urged by spring 55 into closed position by thrusting the plunger upward.

This housing 25 is anchored with the casing 24 by bolts 56. At the chamber 49, there is diaphragm 57 through which extends stem 58 anchored with the diaphragm 57 by nuts 59. This stem 58 upwardly extends through auxiliary housing portion 60 and there provides knife edge bearing 61 coacting with lever 62 adjacent fixed fulcrum knife edge bearing 63 carried by the casing portion 60. This lever 62 is herein shown as of scale beam character and has thereon bracket 64 for adjusting screw 65 operable to position counter-weight 66 along the scale beam or lever 62 into the desired neutralizing position for operation, and when so positioned, set screw 67 may hold this counter-weight 66 in the adjusted relation.

Additionally, for adjusting the action of this lever 62, there is weight 68 shiftable along graduations 69, herein shown as pounds of air pressure. Handle 70 exterior of the casing 24 is rotatable for actuating cable 71 about guide rollers 72, 73, for having flights 74 coact with adjustable weight 68, thereby permitting location of this weight 68 along the scale beam 62 at a desired graduation 69 as disclosed through window 75. Any slack in the cable 71 is taken up by spring 76. The depression of the beam 62, as controlled by the adjustable weight 68 is limited by stop 77. The kick up of the beam 62, as actuated by the stem 58, is limited by cushioning buffer 78 as a smoothing-out means for the device operation, thereby minimizing concussions from air blast action, thus being a material factor in contributing to the maintained accuracy of the instrument as well as its life in use.

In the chamber 49 there is located yoke 79 guided by pin 80 so that as the pressure in the chamber 49 falls say by opening the valve 43, or the pressure action on the lever 62 is such as to depress the stem 58, this stem 58 acts upon the yoke 79 to cause overhang 81 carried by this yoke 79 to thrust plunger 54 in the plug 53 against the action of spring 55 into valve opening position, thus clearing the way for by-pass flow from the region of the spring 34 and ducts 52, 51. The pressure to supplement the opening 34 to hold the piston 33 seated is thus reduced and the pressure at the chamber 27 unseats the piston 33 for supply of high pressure to the chamber 28, duct 37, and reverse air flow in the ducts 47, 48, chamber 49, and the ducts 51, 52. It will be seen that during this brief interval before this valve 54 closes due to rising of the beam 62 by pressure action in the chamber 49, the air flow in the by-pass from the chamber 28 to the side of the piston 33 supplements the action of the spring 34. It follows that the blast of air under pressure from the chamber 28 is effective in the chamber 49 as a gust of high pressure air through the by-pass in aid of the spring 34, thus shifting the plunger 33 into closing position at the port 31. The pressure in the chamber 49 has then acted upon the diaphragm 57 for lifting the plunger 58. This tilts the lever 62 thereby allowing the spring 55 to act for then closing the valve at the plug 53. This closing action with the high pressure air permits the operator as charging the pneumatic tire 45 to have this high pressure air, say two hundred fifty (250) pounds from the line 23, dissipated into the tire 45 until the pressure drops to the region adjusted by weight 68 on the beam 62. The beam then acts to depress the plunger 58 and again open the valve in the plug 53. There is thus release of the air from the by-pass 51, 52, to the chamber 49, and the side of the piston 33 toward the spring 34 is exposed to the lowered pressure air.

The high pressure air, acting upon the opposite side of the piston 33 as the port 30 is closed, at once unseats this plunger 33 for a second gust or pulsation of the high pressure air into the chamber 28 as well as the chamber 49, effecting a lagging closing of the valve 53, 54, in the pulsation operation of this device. As the tire 45 is inflated and the valve 43 is thus closed when removed from the tire valve 44, there is a normal position of rest for the lever 62 which is upon the cushion 78 with the valve 53, 54, closed and this trapped pressure from the chamber 28 holds the piston 33 into closure position at the port 31.

These gusts of air through the port 30 are of considerable volume and permit of rapid filling of even large truck tires and the delivery of air quickly even up to considerable pressures. The pulsations are accordingly of considerable volume and the gusts accordingly have a tendency for severe action in rocking the lever 62. These rocking actions are smoothed out by the chambers 5, 12, as well as the cushion 78.

The pressure air from the receiver 2, due to its pulsating travel, has a tendency, in the high velocity flow intervals, as alternating with the intervals of rest, thus to progress and entrain objectionable solid material as well as liquid, were such pulsations uniform throughout a constant cross section of the duct 4, 10, 23. However, the chambers disturb such uniformity and promote a smoothing out of the flow as well as take care of the elimination of impurities which might be detrimental to pneumatic tires of vehicles.

The chamber 28 is shown as provided with branch 82 having fitting 83 with duct extension to chamber 84 having therein piston 85 urged by spring 86 having fiber washer 87 held in contact with seat 88. Adjustable plug 89 determines the holding action of the spring 86 against gusts of air in the chamber 28. This adjustment of the spring 86 is set so as to hold the whistle closed except at the high pressure gusts of air.

These high pressure gusts of air in the chamber 28 and the pulsations overcome the holding action of the spring 86, thus lifting the piston 85 clear of the seat 88 so that spurts of this high pressure air may pass into duct 90 and through minute port 91 for blowing whistle 92 as an audible signal to the operator filling the tire 45. While observation of the lever 62 may be had for the initial adjustment of the weight 68, the operator may, out of view of this instrument and event independent of feeling the pulsations in the duct 41, have audible signal of the whistle as to the continuation in the tire charging operation, so that when the whistle discontinues and accordingly the pulsations are past, the operator may realize that the tire is fully charged and the filling operation may proceed to other tires or such course as may be elected to follow.

In the operation hereunder, it is applicant's experience that delivery of the tire filling air in quantity, quickly, and still within the range of adjustment may be obtained in pulsating delivery wherein the valve condition is not one approaching equilibrium at any position of flow. In other words, the valve is a stable one in closed position and unstable in its open positions, thus rendering the open positions susceptible at all times to discontinuance of pulsating operation. This is a sort of quick throw or snap controller, herein shown as pneumatic by-pass.

For common subject-matter, this case is a continuation in part of my co-pending application S. N. 186,277, filed April 25, 1927, resulting in Patent 1,736,274, of Nov. 19, 1929.

What is claimed and it is desired to secure by United States Letters Patent is:

1. A housing having a supply duct, a delivery duct, a port therebetween, a pulsating closure for the port, a controller adapted to effect pulsating delivery by throwing said closure between open and closed positions, a by-pass included in said controller, said closure being positioned between the ends of said by-pass, a cut-off valve in said by-pass, an automatically rockable lever for closing said valve, and a cushion buffer for the lever.

2. A housing having a supply duct, a delivery duct, a port therebetween, a pulsating closure for the port, a controller adapted to effect pulsating delivery by throwing said closure between open and closed positions, a by-pass included in said controller, said closure being positioned between the ends of said by-pass, a self-closing valve in said by-pass, and a rockable lever coacting for opening said valve.

3. A housing having a supply duct, a delivery duct, a port therebetween, a pulsating closure for the port, a delivery duct pressure controller, a controller adapted to effect pulsating delivery by throwing said closure between open and closed positions, a by-pass included in said controller, said closure being positioned between the ends of said by-pass, a cut-off valve in said by-pass, a rockable lever having an idle position with said valve closing on delivery duct pressure rise, a supply reservoir for the supply duct, and pulsation velocity checking means in said supply duct.

4. A housing having a supply duct, a delivery duct, a port therebetween, a spring seated valve movable into closed position at said port from the supply duct side, and a controller adapted to effect pulsating delivery by throwing said valve between open and closed positions, a by-pass included in said controller, said valve being positioned between the ends of said by-pass, a lever, and means for adjusting the loading of said lever to vary the back pressure control for automatic discontinuance of said pulsations.

5. A housing having a supply duct, a delivery duct, a port therebetween, a spring seated valve movable into closed position at said port from the supply duct side, and a controller adapted to effect pulsating delivery by throwing said valve between open and closed positions, a by-pass included in said controller, said valve being positioned between the ends of said by-pass, a lever, a member movable in one direction by the lever, and a spring acting upon the member against lever operation of the member for positioning the member for lever succeeding operation.

6. A housing having a supply duct, a delivery duct, a port therebetween, a spring seated valve movable into closed position at said port from the supply duct side, and a controller adapted to effect pulsating delivery by throwing said valve between open and closed positions, a by-pass included in said controller, said valve being positioned between the ends of said by-pass, a lever, a valve member movable in one direction by the lever, and a spring acting upon the member against lever operation of the member for positioning the member for lever succeeding operation by normally holding the valve closed.

7. A housing having a supply duct, a delivery duct, a port therebetween, a spring seated valve movable into closed position at said port from the supply duct side, and a controller adapted to effect pulsating delivery by throwing said valve between open and closed positions, a by-pass included in said controller, said valve being positioned between the ends of said by-pass, a lever, a diaphragm exposed to delivery pressure, a lever responsive to said diaphragm movement, and means for adjusting the loading of said lever to vary the back pressure control for automatic discontinuance of said pulsations.

EARL M. MORLEY.